Aug. 15, 1961     J. WALKER     2,996,149
LUBRICATING SYSTEMS
Filed Nov. 16, 1959
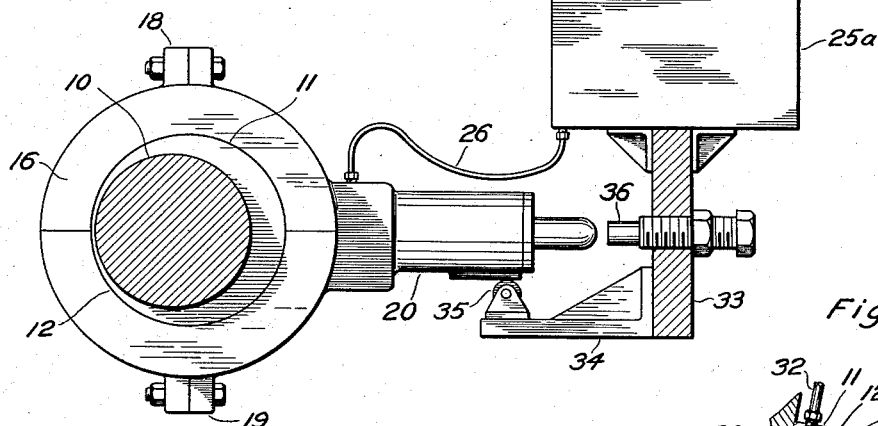
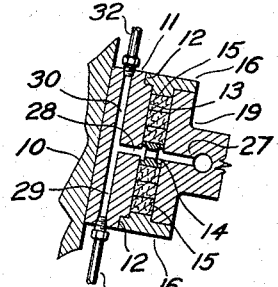
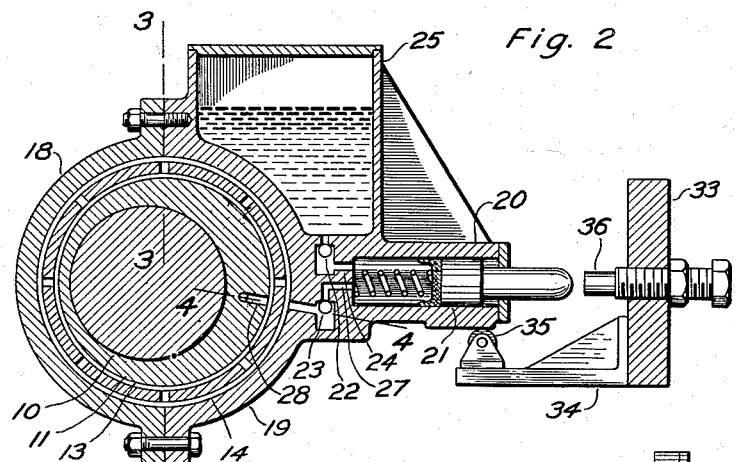
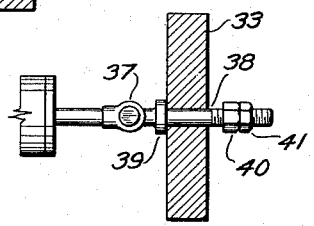
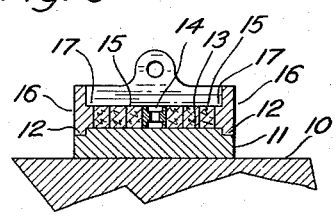
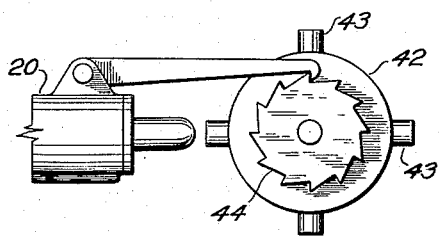
INVENTOR.
John Walker

United States Patent Office 2,996,149
Patented Aug. 15, 1961

2,996,149
LUBRICATING SYSTEMS
John Walker, 33 El Comino Corto, Walnut Creek, Calif.
Filed Nov. 16, 1959, Ser. No. 853,278
6 Claims. (Cl. 184—27)

This invention relates to lubricating systems, and more particularly to systems whereby a more or less continuous supply of lubricant can be fed to the moving parts of machinery while the machinery is in operation.

It is a well recognized fact that in order for machinery to operate at maximum efficiency, and to avoid undue wear of moving parts due to abrasion and consequent overheating, it is essential that a film of lubricant be maintained between all sliding, restraining surfaces. This is especially true of surfaces which, due to their peculiar configuration, and the specific function of the elements of which they form a part, are not only subjected to a combination of sliding actions relative to each other, but are also subjected to shock and impact loads of varying intensity.

As an example, it will be readily apparent that the journal of a shaft which merely rotates within a bushing or a pillow block, and which is of ample proportions to adequately support the radial load for which it was designed, presents little or no problem as far as lubrication is concerned. The inherent characteristics of a combination of rotating journal and supporting bearing are such that the wiping action of the sliding surfaces maintains a film of lubricant at the location where it is most needed, and means of keeping such a combination supplied with lubricant presents no difficulty, even with the rotating element in continuous operation.

At the other extreme are those aforementioned elements, which being subjected to shock and impact, and which by their construction and condition of operation, have a natural tendency to spread and force out the film of lubricant which is introduced between their sliding and impacting surfaces. In this category may be included universal joints, connecting rods and cranks subjected to reversals of stresses, and in general, all reciprocating elements and parts which, in motion, are not confined to specific unit planes of rotation.

The problem of maintaining an adequate film of lubricant between the restraining surfaces of moving elements of this class, is one which very frequently is most difficult with which to cope, this being especially true in the case of heavy machinery involving the motion of parts of relatively great mass, high velocity or dynamic unbalance, or a combination of two or more of these conditions. Obviously, the application of such conventional methods of providing a lubricant as grease cups, syphon wicks and the like to the moving parts of a machine, is limited to those cases where the lubricant can be introduced through stationary elements housing such moving parts.

An especially difficult problem is presented in the case of rolling mill machinery with particular reference to the spindles operably connecting the pinion shafts of the pinion stands with the rolls in the roll housing. These spindles have universal connections at each end. They are so constructed that a certain amount of longitudinal movement can take place between the connecting elements. This is made necessary due to the fact that while the roll stand and the pinion stand are in a fixed relationship and their rotating elements are in alignment with reference to a vertical plane, the spindles must be so constructed and arranged as to permit adjustment of the rolls, resulting in a spindle angularity up to a maximum of fifteen degrees from a horizontal plane. As the spindles are not extensible, provision has to be made for the aforementioned longitudinal movement.

These universal joint components are of necessity constructed with clearances which can conservatively be described as liberal, and the conditions under which they operate, being subjected to shock, impact, stress reversal and other adverse circumstances, make it essential that adequate lubrication be provided and maintained in order to ensure continued and trouble free operation.

Up to the present, it has been the practice to lubricate these universal joints at such times as the mill is not in operation, each periodic application being required to suffice until the mill was once more shut down. Obviously, this practice was far from being satisfactory. As soon as the machinery was put into operation, the lubricant was gradually forced from between the joints, and, after a certain period of time, the spindles would be operating without benefit of lubrication, and with consequent destructive results. The alternate choice of more frequent applications of lubricant of course involved more shut down time and resultant curtailment of production schedules.

A self-contained lubricating system for mill spindles presently in use utilizes the rotation of the spindle to actuate the grease pump. This pump, which has an attached grease container, is mounted on, and revolves with the spindle. A cam, fixed to the stationary spindle support bearing, contacts and actuates the pump plunger at every revolution of the spindle.

While it is a self-contained unit, this arrangement has the inherent defect of causing an out-of-balance condition due to the mass of the pump rotating in eccentric relationship with the mill spindle. This condition will be further aggravated by any increase in capacity and volume of the grease receptacle and its contents respectively with consequent additional weight. The result of this is that the amount of grease required to initially fill the system is limited to a point where frequent replenishing becomes necessary.

The present invention discloses a system which is entirely automatic and self-contained, provides an arrangement whereby the grease pump does not rotate with the spindle, and the grease container is not limited in capacity as it remains in a substantially stationary position.

It is the principal object of the present invention to provide an automatic system which will ensure a continuous supply of lubricant to relatively inaccessible movable machine components while such parts are in actual operation.

A further object of the invention is the provision of a lubricating system which can be applied closely adjacent to the components served, thereby precluding the use of long feed lines, long interior grease passages, and other objectionable features.

A still further object of the invention is the provision of a lubricating system which can be readily removed when necessary for repair or replacement of the machine elements serviced thereby.

These and other objects of the invention will become apparent during the course of the following description and appended claims, taken in connection with the attached drawings forming a part hereof.

In the drawings:

FIGURE 1 is a side elevation showing an application of one embodiment of the improved lubricating system.

FIGURE 2 is a vertical cross section in a plane parallel to that of FIGURE 1, but showing a modified arrangement of pump and grease container.

FIGURE 3 is a fragmentary cross section taken on line 3—3 of FIGURE 2.

FIGURE 4 is a fragmentary cross section taken on line 4—4 of FIGURE 2.

FIGURE 5 is a modified form of pump actuating element.

FIGURE 6 is a further modification illustrating a pump actuating element adapted to intermittent pump operation.

Referring to the drawing in detail, a shaft or spindle 10 has mounted thereon a relatively wide eccentric sheave 11 which can be secured by a key or other suitable means. The eccentric sheave 11 is of stepped construction having a relatively narrow portion 12 of reduced diameter at each side thereof and a relatively wide portion 13 of increased diameter intermediate said narrow portions. A lantern ring 14, of conventional design, is loosely mounted on the eccentric sheave 11, being centrally positioned on the portion 13 of increased diameter. Also mounted on the portion 13 of the eccentric sheave 11 is a plurality of packing rings 15, an equal number of rings being disposed at each side of the lantern ring 14.

Adapted to hold the packing rings 15 and the lantern ring 14 in place on the eccentric sheave 11, are two identical flanges 16. These flanges, which are mounted in opposed or confronting relationship as illustrated on FIGURE 3 are made complementary to, and are adapted to rotatably engage the portions 12 of reduced diameter of the eccentric sheave 11. The flanges 16 are also provided with concentric annular projections or collars 17 which, extending inwardly over the portion 13 of the eccentric sheave 11, make contact with and maintain in place the packing rings 15 in the conventional gland, stuffing box relationship.

The outer peripheries of the collars 17, packing rings 15 and lantern ring 14, being of uniform diameter, form the bottom of a groove or recess the width of which is limited by the radially extending portions of the flanges 16. Contained within this groove or recess is an eccentric strap comprising two parts adapted to be bolted together as illustrated and to which the flanges 16 of split construction, are secured in any suitable manner. One part 18 is of the usual design. The other part 19 extends radially outward forming the cylinder 20 of a reciprocating force pump.

This pump is of conventional design and comprises a spring loaded piston or plunger 21, and inlet and outlet valves 22 and 23 respectively. An inlet port 24, controlled by the valve 22, connects the interior of the cylinder 20 with a lubricant or grease container 25 which can be mounted on the eccentric strap 19 or as illustrated, can be formed integral therewith. If desired, a container such as 25a can be mounted separately and be connected by a flexible hose 26 as shown on FIGURE 1. This method of mounting precludes all motion of the grease container, and therefore, its capacity then is limited only by space considerations.

A discharge port 27 connects the interior of the cylinder 20 with the inside surface of the eccentric strap 19 at which point it is in communication with the lantern ring 14. Functioning in the conventional manner, the lantern ring 14 will be in communication with any aligned port such as 28 in the eccentric sheave 11, and from there, the ports can be continued longitudinally of the shaft 10 as indicated on FIGURE 4 by 29 and 30 to the sides of the eccentric sheave 11. As illustrated, connection can be made at these points, and pipes or tubing such as 31 and 32 can be led to any desired location on the shaft 10.

By reference to FIGURE 2 it will be seen how the device is operatively mounted, the shaft 10 in this case representing a mill spindle having a spindle support bar 33 spaced apart from and parallel thereto. A bracket 34 mounted on the bar 33 supports a roller 35, which, while preventing rotation of the eccentric strap and pump assembly, permits oscillating motion incidental to the revolution of the eccentric sheave 11, the eccentric strap and pump assembly being provided with a guide surface adapted to ride upon the roller 35. An adjustable stop 36 on the support bar 33 is adapted to restrict the tendency of the spring loaded piston 21 to move with the cylinder 20 thereby causing relative motion between the piston and the cylinder. It will be apparent that by this arrangement, the stroke of the pump can be adjusted to any point within a range extending from zero to twice the throw of the eccentric sheave.

It will be obvious from the foregoing that, with the shaft 10 rotating in a clockwise direction as viewed from FIGURE 2, with the adjusting screw set to ensure pumping action, and with the container being supplied with lubricant, a quantity of lubricant will be discharged through the ports or passages 27, 28, 29 and 30 and delivered to such locations as required, upon every revolution of the shaft.

FIGURE 5 discloses a modified construction wherein the piston 21 is provided with a clevis and eye connection 37 to a rod 38 which is slidably mounted in the spindle support bar 33. This rod 38 has a fixed collar or stop 39 on one end thereof, and an adjustable nut or stop collar 40 on the other end. A threaded portion on the rod 38 provides for adjustment of the collar 40 which can be locked in position by means of a locknut 41 intended for that purpose. It will be apparent that by means of this arrangement, the rod 38 can be set to control the stroke of the piston 20, the greater the stroke of the rod 38 the less will be the stroke of the piston 20, and vise versa.

A further modification is illustrated in FIGURE 6 whereby provision is made for intermittent operation of the pump. In the embodiment, a rotatable element in the form of a wheel 42 having a plurality of radially extending stops 43 spaced around the periphery thereof is shown. The stops 43 can be uniformly spaced or otherwise as desired, they can be of suitable number and can extend outward more or less, or they can be adjustable to suit the particular conditions which may be peculiar to any specific application. A ratchet wheel 44 secured to the side of the element 42, is adapted to cooperate with and be rotated by a pivotally mounted pawl or hook 45 attached to the cylinder 20 as indicated. Each revolution of the shaft 10 and eccentric sheave 11 will cause oscillation of the hook 45, which, operating in the manner well known in the art, will cause intermittent and partial rotation of the ratchet wheel 44 and attached element 42. By this method it is possible to establish a ratio between the shaft revolutions and the pump strokes, as it will be obvious that the pump will only function when one of the stops 43 is in alignment with the piston during its forward stroke.

From the foregoing it will be apparent that I have disclosed an automatic and self-contained lubricating system comprising a novel arrangement and combination of elements whereby an intermittent supply of lubricant of predetermined regularity and quantity can be effectively furnished to the wearing surfaces of rotating and sliding elements of a machine, while such machine is in operation. This can be accomplished regardless of the fact that the elements to be lubricated are not directly supported by any completely stationary means, and while I have described and illustrated a particular application of the various modifications of my device, it should be understood that such application is not restricted thereto, but is limited only to the extent as defined by the scope of the appended claims, the basic idea disclosed being subject to further modification such as mounting a stationary pump for operation by an equivalent combination of eccentric sheave and related elements.

I claim:

1. An automatic lubricating system comprising in combination, a shaft, an eccentric sheave having a lubricant distribution port therein and being mounted on said shaft, an eccentric strap mounted on said sheave and having means adapted to prevent rotation thereof, said strap and said sheave having connecting lubricant passages, a pump having a lubricant discharge port and a discharge valve and a lubricant intake port and an intake valve and being actuated by said eccentric sheave and strap, said eccentric strap having a lubricant receiving port and lubricant passage means connecting said discharge port with said receiving port, a plunger in said pump, a stop in substantial axial alignment with said plunger and being spaced sufficiently close thereto so as to make contact therewith and cause relative motion between said pump and said plunger.

2. A combination as in claim 1, wherein said stop is adjustable.

3. A combination as in claim 1, wherein said stop comprises a rotatably mounted means having a plunger-contacting stop thereon, and having a ratchet wheel fixed thereto and being in axial alignment therewith, a pawl pivotally attached to said eccentric strap and being adapted to cooperate with said ratchet wheel to effect engagement and disengagement between said plunger and said plunger-contacting stop.

4. A combination as in claim 1, wherein said eccentric strap has a portion extending therefrom and being adapted to form a guide surface, and a pivotally mounted roller adapted to cooperate with said guide surface and prevent rotation of said strap.

5. An automatic lubricating system comprising in combination, a shaft, an eccentric sheave having a lubricant distribution port therein and being mounted on said shaft an eccentric strap mounted on said sheave, said strap and said sheave having connecting lubricant passages, a pump having a lubricant discharge port and a discharge valve and a lubricant intake port and an intake valve and being actuated by said eccentric sheave and strap, said eccentric strap having a lubricant receiving port and lubricant passage means connecting said discharge port with said receiving port, a plunger in said pump, a slidably mounted rod pivoted to said plunger in substantially axial alignment therewith, a stop mounted on said rod for contact with the mounting thereof and being adapted to limit the travel of said rod and said plunger.

6. A combination as in claim 5 wherein the travel of said rod and said plunger is adjustable.

References Cited in the file of this patent

UNITED STATES PATENTS

| | | |
|---|---|---|
| 764,886 | Donnenwerth | July 12, 1904 |
| 2,013,478 | Read | Sept. 3, 1935 |
| 2,925,885 | White | Feb. 23, 1960 |